US010248974B2

(12) United States Patent
Firth et al.

(10) Patent No.: US 10,248,974 B2
(45) Date of Patent: Apr. 2, 2019

(54) ASSESSING PROBABILITY OF WINNING AN IN-FLIGHT DEAL FOR DIFFERENT PRICE POINTS

(71) Applicant: International Business Machines Corporation, Armonk, NY (US)

(72) Inventors: Michael K. Firth, Epping (AU); Aly Megahed, San Jose, CA (US); Guangjie Ren, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 15/192,892

(22) Filed: Jun. 24, 2016

(65) Prior Publication Data

US 2017/0372378 A1   Dec. 28, 2017

(51) Int. Cl.
*G06Q 30/00* (2012.01)
*G06Q 30/02* (2012.01)
*G06Q 10/04* (2012.01)

(52) U.S. Cl.
CPC ......... *G06Q 30/0275* (2013.01); *G06Q 10/04* (2013.01)

(58) Field of Classification Search
None
See application file for complete search history.

(56) References Cited

U.S. PATENT DOCUMENTS

| | | | |
|---|---|---|---|
| 6,195,646 B1 * | 2/2001 | Grosh | G06Q 20/102 705/26.41 |
| 7,865,384 B2 | 1/2011 | Anderson et al. | |
| 7,937,304 B2 | 5/2011 | Melnicoff et al. | |
| 7,953,646 B2 | 5/2011 | Pallister et al. | |
| 7,971,180 B2 | 6/2011 | Kreamer et al. | |
| 8,781,989 B2 | 7/2014 | Duchon | |
| 8,892,625 B2 | 11/2014 | Liang et al. | |
| 9,124,601 B2 | 9/2015 | Stoica et al. | |
| 9,129,299 B1 | 9/2015 | Donohue et al. | |
| 9,230,216 B2 | 1/2016 | Bart et al. | |
| 9,286,391 B1 | 3/2016 | Dykstra | |
| 9,418,339 B1 | 8/2016 | Leonard et al. | |

(Continued)

FOREIGN PATENT DOCUMENTS

| | | |
|---|---|---|
| WO | 2012016439 A1 | 2/2012 |
| WO | 2014014470 A1 | 1/2014 |
| WO | 2014060226 A1 | 4/2014 |

OTHER PUBLICATIONS

Anonymous, "Method and System for Providing a Proactive Backup for Value-Added Information Technology (IT) Service Delivery Requirements", Dec. 2, 2014, pp. 1-5, IP.com, United States.

(Continued)

*Primary Examiner* — Matthew T Sittner
(74) *Attorney, Agent, or Firm* — Sherman IP LLP; Kenneth L. Sherman; Hemavathy Perumal

(57) ABSTRACT

One embodiment provides a method for assessing probability of winning an in-flight deal. The method comprises receiving information for the in-flight deal. The information for the in-flight deal comprises a set of price points for the in-flight deal and metadata relating to the in-flight deal. The method further comprises, for each price point of the set of price points, predicting a probability of winning the in-flight deal at the price point based on a predictive analytics model.

20 Claims, 10 Drawing Sheets

(56) References Cited

U.S. PATENT DOCUMENTS

| | | | |
|---|---|---|---|
| 9,619,583 B2* | 4/2017 | Lau | G06F 17/30979 |
| 9,646,066 B2 | 5/2017 | Olsen et al. | |
| 9,652,776 B2 | 5/2017 | Olsen et al. | |
| 9,672,074 B2 | 6/2017 | Gaurav et al. | |
| 9,755,988 B2 | 9/2017 | Arnette et al. | |
| 9,779,407 B2 | 10/2017 | Adjaoute | |
| 2003/0130861 A1* | 7/2003 | Seitz | G06Q 10/06 |
| | | | 705/400 |
| 2003/0195832 A1* | 10/2003 | Cao | G06O 30/08 |
| | | | 705/37 |
| 2003/0220773 A1* | 11/2003 | Haas | G06Q 10/0637 |
| | | | 703/2 |
| 2004/0167789 A1 | 8/2004 | Roberts et al. | |
| 2004/0181370 A1* | 9/2004 | Froehlich | G06F 9/5083 |
| | | | 702/187 |
| 2004/0181457 A1* | 9/2004 | Biebesheimer | G06Q 30/02 |
| | | | 705/14.49 |
| 2005/0071182 A1* | 3/2005 | Aikens | G06Q 10/00 |
| | | | 705/500 |
| 2005/0131754 A1 | 6/2005 | Chapman et al. | |
| 2005/0189415 A1* | 9/2005 | Fano | G06Q 10/087 |
| | | | 235/383 |
| 2005/0256946 A1* | 11/2005 | Childress | G06Q 10/06 |
| | | | 709/223 |
| 2005/0278202 A1 | 12/2005 | Broomhall et al. | |
| 2006/0089866 A1* | 4/2006 | Cheng | G06Q 10/10 |
| | | | 709/204 |
| 2006/0111973 A1* | 5/2006 | Brown | G06Q 30/02 |
| | | | 705/14.27 |
| 2006/0129879 A1 | 6/2006 | Alznauer et al. | |
| 2006/0167984 A1* | 7/2006 | Fellenstein | G06F 9/5072 |
| | | | 709/203 |
| 2007/0143171 A1* | 6/2007 | Boyd | G06Q 30/0278 |
| | | | 705/306 |
| 2008/0167928 A1* | 7/2008 | Cao | G06Q 10/06 |
| | | | 705/80 |
| 2009/0012800 A1 | 1/2009 | Devarakonda et al. | |
| 2009/0030829 A1* | 1/2009 | Chatter | G06Q 30/0206 |
| | | | 705/37 |
| 2010/0235294 A1 | 9/2010 | Raghupathy et al. | |
| 2010/0250296 A1* | 9/2010 | Channabasavaiah | G06Q 10/04 |
| | | | 705/7.25 |
| 2010/0262509 A1* | 10/2010 | Delia | G06Q 10/02 |
| | | | 705/26.1 |
| 2010/0262548 A1 | 10/2010 | Herbst et al. | |
| 2011/0004509 A1* | 1/2011 | Wu | G06F 17/3053 |
| | | | 705/7.37 |
| 2011/0066466 A1 | 3/2011 | Narayanan | |
| 2011/0238477 A1* | 9/2011 | Urbanski | G06Q 30/0224 |
| | | | 705/14.25 |
| 2012/0029974 A1* | 2/2012 | Councill | G06Q 30/0206 |
| | | | 705/7.35 |
| 2012/0030199 A1* | 2/2012 | Mohajer | G06F 17/30899 |
| | | | 707/723 |
| 2012/0059680 A1 | 3/2012 | Guthrie et al. | |
| 2012/0221430 A1* | 8/2012 | Naghmouchi | G06Q 30/0283 |
| | | | 705/26.7 |
| 2012/0232948 A1 | 9/2012 | Wolf et al. | |
| 2012/0290347 A1 | 11/2012 | Elazouni et al. | |
| 2012/0290348 A1* | 11/2012 | Hackett | G06Q 10/06 |
| | | | 705/7.13 |
| 2012/0290500 A1* | 11/2012 | Ettl | G06O 30/0283 |
| | | | 705/36 R |
| 2012/0303400 A1* | 11/2012 | Boss | G06Q 30/06 |
| | | | 705/7.12 |
| 2012/0303491 A1* | 11/2012 | Hill | G06Q 30/06 |
| | | | 705/27.2 |
| 2012/0317050 A1 | 12/2012 | Bermuth | |
| 2013/0054296 A1* | 2/2013 | Gajakosh | G06Q 10/06 |
| | | | 705/7.22 |
| 2013/0218625 A1 | 8/2013 | Duquette et al. | |
| 2013/0246213 A1* | 9/2013 | Lee | G06Q 30/0283 |
| | | | 705/26.4 |
| 2013/0275085 A1* | 10/2013 | Cheng | G06Q 10/0639 |
| | | | 702/182 |
| 2013/0297412 A1* | 11/2013 | Batra | G06Q 30/02 |
| | | | 705/14.49 |
| 2013/0332243 A1 | 12/2013 | Gifford et al. | |
| 2014/0006044 A1 | 1/2014 | Pradhan et al. | |
| 2014/0052492 A1* | 2/2014 | Boss | G06Q 10/06315 |
| | | | 705/7.25 |
| 2014/0096140 A1* | 4/2014 | Aquino | G06Q 10/1095 |
| | | | 718/103 |
| 2014/0310065 A1* | 10/2014 | Chowdhary | G06Q 30/0283 |
| | | | 705/7.35 |
| 2015/0100384 A1* | 4/2015 | Ettl | G06Q 30/0206 |
| | | | 705/7.35 |
| 2015/0193709 A1 | 7/2015 | Ramesh Babu | |
| 2016/0140789 A1* | 5/2016 | Wickersham, III | G07C 13/00 |
| | | | 705/12 |
| 2016/0148227 A1* | 5/2016 | Choe | G06Q 30/0202 |
| | | | 705/7.31 |
| 2016/0203506 A1* | 7/2016 | Butler, IV | G06Q 30/0222 |
| | | | 705/14.23 |
| 2017/0004408 A1* | 1/2017 | Edelen | G06N 5/02 |
| 2017/0103451 A1 | 4/2017 | Alipov et al. | |
| 2017/0372341 A1* | 12/2017 | Fukuda | G06Q 30/0206 |
| 2017/0372349 A1* | 12/2017 | Fukuda | G06Q 30/0244 |
| 2017/0372378 A1* | 12/2017 | Firth | G06Q 10/04 |
| 2018/0144314 A1 | 5/2018 | Miller | |

OTHER PUBLICATIONS

Anonymous, "Methods and Systems for Adaptive Management and Dynamic Pricing of Information Technology Services", Feb. 25, 2013, pp. 1-4, IP.com, United States.

Anonymous, "Dynamic pricing of web services", Jun. 18, 2012, pp. 1-4, IP.com, United States.

Greenia, D.B. et al., "A Win Prediction Model for IT Outsourcing Bids", Service Research and Innovation Institute Global Conference, Apr. 2014, pp. 1-5, ResearchGate, United States.

Akkiraju, R. et al., "On Pricing Complex IT Service Solutions", Proceedings of the 2014 Annual SRII Global Conference (SRII '14), Apr. 23, 2014, pp. 55-64, IEEE Computer Society, United States.

Agarwal, D. et al., "fLDA: Matrix Factorization through Latent Dirichlet Allocation", Proceedings of the 3rd ACM International Conference on Web Search and Data Mining (WSDM'10), Feb. 4, 2010, pp. 91-100, ACM, United States.

Suri, P.K. et al., "Estimating the Probability of Project Completion by SIM_DEL Estimator", Proceedings of the International Journal of Computer Science and Information Technologies (IJCSIT), Aug. 2012, pp. 4938-4945, vol. 3 (4), ISSN: 0975-9646, United States.

Carman, S. et al., "Predictive Value of Comments in the Service Engagement Process", Proceedings of the American Society for Information Science and Technology (ASIST), 2012, pp. 1-12, vol. 49, United States.

Greenia, D.B. et al., "A Win Prediction Model for IT Outsourcing Bids", Proceedings of the SRII Global Conference, Apr. 2014, pp. 1-5, ResearchGate, United States.

Motahari Nezhad, H.R. et al., "Health identification and outcome prediction for outsourcing services based on textual comments", Proceedings of 2014 IEEE International Conference on Services Computing (SCC), Jun. 27, 2014-Jul. 2, 2014, pp. 155-162, IEEE, United States.

Yan, J. et al., "On Machine Learning towards Predictive Sales Pipeline Analytics", Proceedings of the 29th AAAI Conference on Artificial Intelligence, 2015, pp. 1945-1951, United States.

Lee, H. et al., "Enterprise Architecture Content Model Applied to Complexity Management while Delivering IT Services", Proceedings of the 2014 IEEE International Conference on Services Computing (SCC), Jun. 27, 2014-Jul. 2, 2014, pp. 408-415, IEEE, United States.

Megahed, A. et al., "Pricing IT Services Deals: A More Agile Top-Down Approach", for publication in Nov. 2015 at 2015 ICSOC Conference, pp. 1-4, Goa, India.

(56) References Cited

OTHER PUBLICATIONS

IBM, "Auto-Configuring Clusters Through Presence Based Discovery," IP.Com, Feb. 6, 2007, pp. 1-3, United States.

Mell, P., et al., "The NIST Definition of Cloud Computing", National Institute of Standards and Technology Special Publication 800-145, Sep. 2011, pp. 1-7, U.S. Department of Commerce, United States.

PR Newswire, "EDS Signs Contract With United Airlines to Upgrade Computer Systems and Service to Reduce IT Costs," Jan. 17, 2006, pp. 1-2, Electronic Data Systems Corporation, United States.

Business Wire, "DataDirect Technologies Helps Subaru Reduce IT Support Costs and Improve Customer Service," Nov. 2001, pp. 1-2, Rockville, United States.

Rai, V.K., et al., "A Systemic and Relational Approach to Pricing Services," Service Science, Mar. 2016, pp. 37-58, vol. 8, No. 1, Institute for Operations Research arid the Management Sciences (INFORMS), Maryland, United States.

Gaivoronski, A.A., et al., "Risk-Balanced Dimensioning and Pricing of End-to-End Differentiated Services," European Journal of Operational Research, 2016, pp. 644-655, vol. 254, No. 2, Elsevier B.V., Netherlands.

Gajananan, K., et al., "A Method for Estimating Annual Unit Cost Reduction of IT Service Deals", Submitted for Publication at the 50th Hawaii International Conference on System Sciences (HICCS), 2017, pp. 1-9, United States.

Megahed, A., et al., "Top-Down Pricing of IT Services Deals with Recommendation for Missing Values of Historical and Market Data", Submitted for Publication at the 14th International Conference on Service Oriented Computing (ICSOC), 2016, pp. 1-15, United States.

Gajananan, K., et al., "A Top-Down Pricing Algorithm for IT Service Contracts Using Lower Level Service Data", In Proceedings of the 13th IEEE International Conference on Services Computing (SCC), Jun. 2016, pp. 720-727, IEEE, United States.

Megahed, A., et al., "Modeling Business Insights into Predictive Analytics for the Outcome of IT Service Contracts", In Proceedings of the 12th IEEE International Conference on Services Computing (SCC), Jun. 2015, pp. 515-521, IEEE, United States [Abstract Only].

Anonymous, "Method for Cloud and Cloud-Service Selection", IP.Com, May 13, 2011, pp. 1-8, United States.

List of IBM Patents or Patent Applications Treated as Related Form.

List of IBM Patents or Patent Applications Treated as Related Form; Firth, M.K., U.S. Appl. No. 16/224,595, filed Dec. 18, 2018.

Lakoff, G., et al. "Metaphors We Live By," 1980, pp. ix-55, University of Chicago Press, Chicago, United States.

Edelman, S., "Computing the Mind," 2008, pp. xi-36, Oxford University Press, New York, United States.

Murphy, K.P., "Machine Learning, A Probabilistic Perspective," 2012, pp. 947-956, MIT Press, United States [Abstract Only].

Goffman, E., "Frame Analysis: An Essay on the Organization of Experience," 1974, pp. 1-39, 301-344, Northeastern University Press, United States [Abstract Only].

\* cited by examiner

FIG. 4

ASSESSING PROBABILITY OF WINNING AN IN-FLIGHT DEAL FOR DIFFERENT PRICE POINTS

The present invention generally relates to deal analysis, and more particularly, to a system, method, and computer program product for assessing probability of winning an in-flight deal for different price points.

BACKGROUND

A service deal is an arrangement/contract between two or more parties (e.g., a service provider and a client) for delivery of services. Examples of service deals include, but are not limited to, Information Technology (IT) services contracts, medical services contracts, financial services outsourcing contracts, and any other kind of service deal that goes through a tendering process. A tendering process involves multiple service providers preparing solutions for a service deal and competing with one another to win the deal. Each solution is a customized proposal including pricing of particular services of the deal. Each competing service provider submits a solution to the client for review.

The types of services included in a service deal may include complex, high-valued services that are difficult to price. For example, high-valued services included in an IT service contract may include, but are not limited to, Cloud, Mobility, Intel, Unix, Mainframe, Network Services, and service delivery management and governance.

SUMMARY

One embodiment provides a method for assessing probability of winning an in-flight deal. The method comprises receiving information for the in-flight deal. The information for the in-flight deal comprises a set of price points for the in-flight deal and metadata relating to the in-flight deal. The method further comprises, for each price point of the set of price points, predicting a probability of winning the in-flight deal at the price point based on a predictive analytics model.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates an example representation of information relating to a set of deals, in accordance with an embodiment of the invention;

Figure 1:
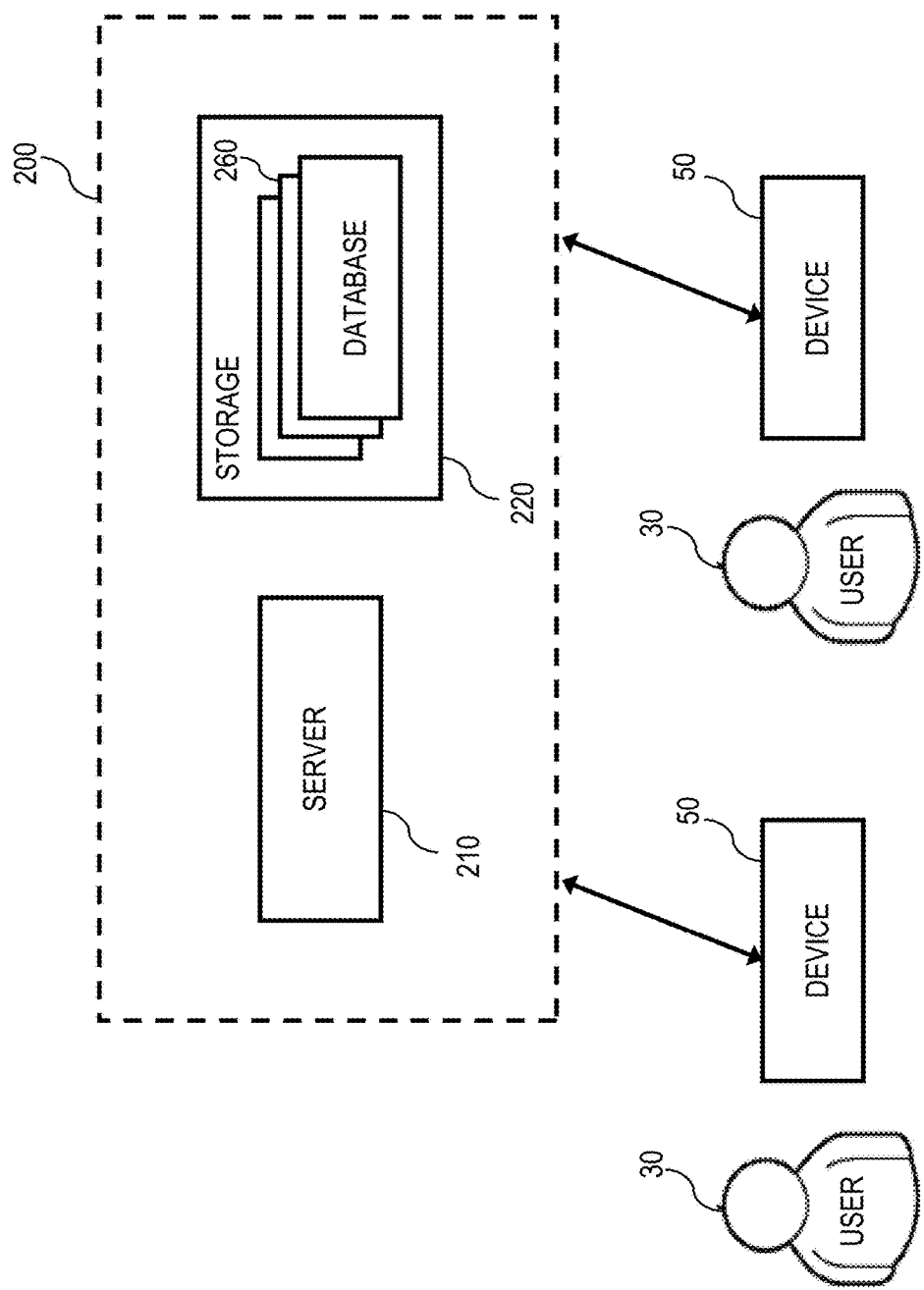
FIG. 1 illustrates an example system for deal analysis, in accordance with an embodiment of the invention.

The detailed description explains the preferred embodiments of the invention, together with advantages and features, by way of example with reference to the drawings.

DETAILED DESCRIPTION

The present invention generally relates to deal analysis, and more particularly, to a system, method, and computer program product for assessing probability of winning an in-flight deal for different price points. One embodiment provides a method for assessing probability of winning an in-flight deal. The method comprises receiving information for the in-flight deal. The information for the in-flight deal comprises a set of price points for the in-flight deal and metadata relating to the in-flight deal. The method further comprises, for each price point of the set of price points, predicting a probability of winning the in-flight deal at the price point based on a predictive analytics model.

In this specification, the term "in-flight deal" is used to generally refer to a complex service deal either to be priced (i.e., to estimate its total cost and target price) or to assess probability of winning for different price points. The terms "in-flight deal", "scenario", "deal to be priced", and "service delivery contract" may be used interchangeably in this specification. The term "solution designer" is used to generally refer to an individual or a group of individuals tasked with preparing a solution for a service deal.

In this specification, the term "historical deal" is used to generally refer to a service deal that has occurred in the past and includes historical rates. The term "market deal" is used to generally refer to a service deal that is current and includes current market rates. The term "peer deal" is used to generally refer to a service deal for use as a reference for an in-flight deal. A peer deal may be a historical deal or a market deal. A peer deal includes one or more services of an in-flight deal to be priced. A solution designer may assess competitiveness of a solution by comparing the solution against historical and/or market deals.

In this specification, the terms "win", "won", or "winning" are used to generally refer to a successful outcome in relation to a service deal (e.g., a service provider bidding on the deal wins the deal). The terms "lose", "lost", or "losing" are used to generally refer to an unsuccessful outcome in relation to a service deal (e.g., a service provider bidding on the deal loses the deal because a competing service provider won the deal, the service provider stopped bidding on the deal, or a client decided not to pursue the deal). The term "deal outcome" is used to generally refer to whether a service deal is won (i.e., a successful outcome) or lost (i.e., an unsuccessful outcome).

In this specification, the term "contract year" is used to generally refer to a calendar year during which delivery of services of a service deal to a client begins/starts. The term "geography" is used to generally refer to a geographical location of a client. The term "industry" is used to generally refer to an industry of a client. Examples of an industry of a client includes, but is not limited to, banking, insurance, automotive, etc.

In this specification, the term "price point" is used to generally refer to a potential bidding price for an in-flight deal. A price point is a significant factor that affects chances of winning a deal.

A complex service deal typically includes a hierarchy of services ("service hierarchy") comprising multiple levels of service ("service levels"). A highest/first service level in a service hierarchy is decomposable into one or more lower/additional service levels. For example, end user is a highest/first service level that is decomposable into lower/additional service levels, such as hardware for end users, end user refresh, etc. A lower/additional service level itself may be further decomposable.

FIG. 1 illustrates an example system 200 for deal analysis, in accordance with an embodiment of the invention. The system 200 comprises one or more server devices 210, and one or more storage devices 220. The storage devices 220 maintain one or more databases 260. As described in detail later herein, one or more application units may execute/operate on the server devices 210 to provide one or more tools to facilitate deal analysis. For example, in one embodiment, the system 200 provides a tool for augmenting missing values in historical and/or market data for deals. As another example, in one embodiment, the system 200 provides a tool for estimating costs and prices of an in-flight deal based on information relating to peer deals (i.e., historical or market deals). As yet another example, in one embodiment, the system 200 provides a tool for predicting probability of winning an in-flight deal at any price point based on historical data pricing, market data pricing, a user-specified price, and/or any other price point. The system 200 may provide a combination of one or more tools listed above.

A user 30 (e.g., a solution designer, a service provider, etc.) may access the system 200 using an electronic device 50, such as a personal computer, or a mobile device (e.g., a laptop computer, a tablet, a mobile phone, etc.). In one embodiment, each device 50 exchanges data with the system 200 over a connection (e.g., a wireless connection, a wired connection, or a combination of the two).

Figure 2:
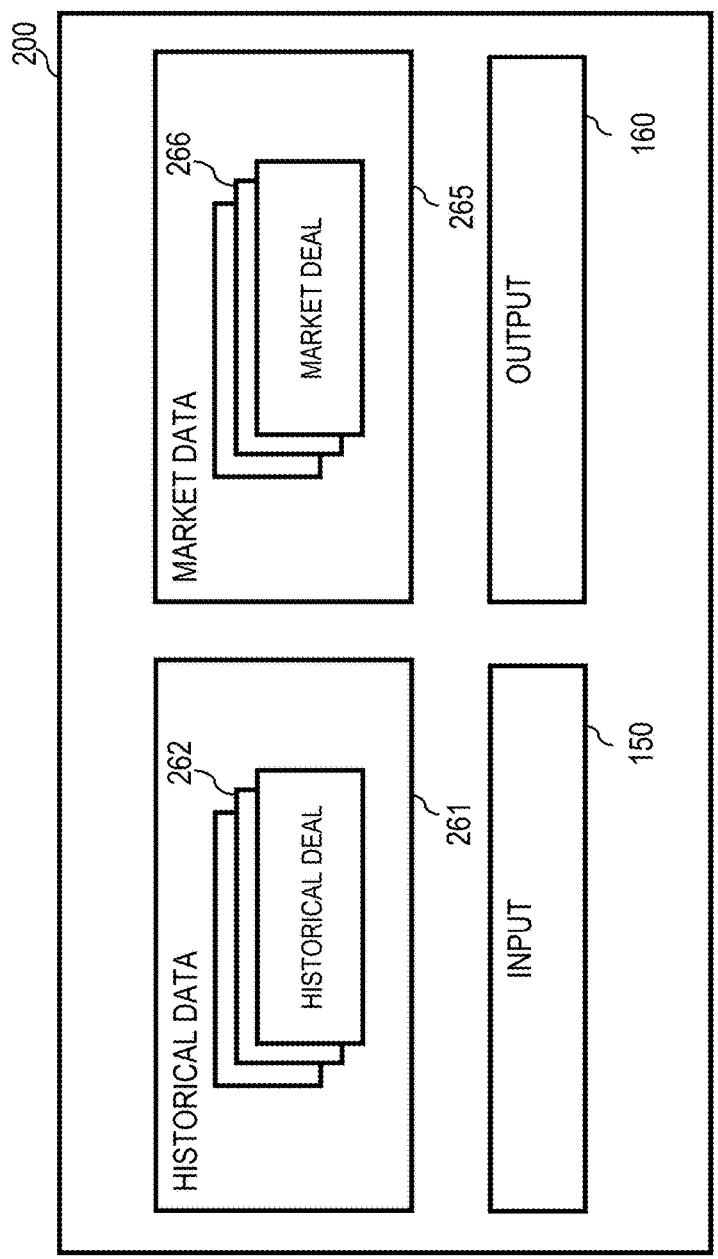
FIG. 2 illustrates the system in detail, in accordance with an embodiment of the invention.

FIG. 2 illustrates the system 200 in detail, in accordance with an embodiment of the invention. The system 200 comprises an input interface 150 configured to receive, as input, at least one of the following: (1) information relating to a set of deals (i.e., historical or market deals), and (2) one or more user-specified input parameters.

In one embodiment, the information relating to the set of deals comprises, but is not limited to, the following: cost data structure for each service level in a service hierarchy of each deal (e.g., actual/observed cost data for each service included in the deal), and (2) metadata for each deal. In one embodiment, a cost data structure 201 (FIG. 4) comprises a matrix of cost values ("cost matrix").

Metadata for a deal includes, but is not limited to, at least one or more of following types of metadata: type of client, deal outcome, contract year, geography, and industry.

In one embodiment, the information relating to the set of deals is maintained on at least one database 260 (FIG. 1) of the storage devices 220 (FIG. 1). For example, in one embodiment, the storage devices 220 maintains at least one collection 261 of historical data. Each collection 261 comprises one or more historical data sets 262. Each historical data set 262 corresponds to a historical deal, and comprises actual/observed data for the deal, such as a cost data structure for each service level in a service hierarchy of the deal. As another example, in one embodiment, the storage devices 220 maintains at least one collection 265 of market data. Each collection 265 comprises one or more market data sets 266. Each market data set 266 corresponds to a market deal, and comprises actual/observed data for the deal, such as a cost data structure for each service level in a service hierarchy of the deal.

The system 200 further comprises an output interface 160 configured to provide output. As described in detail later herein, in one embodiment, the system 200 recommends one or more values for augmenting one or more missing values in historical and/or market data, and provides, as output, the recommended values. In another embodiment, the system 200 estimates costs and prices of an in-flight deal based on information relating to a set of peer deals and provides, as output, a set of price points estimated for the in-flight deal. In yet another embodiment, the system 200 predicts probability of winning an in-flight deal at any price point (e.g., an estimate provided by the system 200 or a user-specified price point), and provides, as output, a probability of winning the in-flight deal at the price point.

The system 200 is trained to differentiate between different categories of services included in any deal. In one example implementation, the different categories of services include, but are not limited to, regular services and common services.

A regular service is a service having a corresponding cost (i.e., service cost) that is independent of other services included in the same deal as the regular service. A regular service is also a service having a corresponding baseline. Examples of regular services include, but are not limited to, databases and end users. A corresponding baseline for databases is a total number of databases. A corresponding baseline for end users is a total number of end users.

A common service is a service having a corresponding cost (i.e., service cost) that is dependent on one or more regular services included in the same deal as the common service. Examples of common services include, but are not limited to, account management. A corresponding cost for account management is based on costs of all regular services included in the same deal as account management.

Augmenting Missing Values in Historical and Market Data

As stated above, one or more application units may execute/operate on the server devices 210 to provide a tool for augmenting missing values in historical and/or market data for deals.

Figure 3:
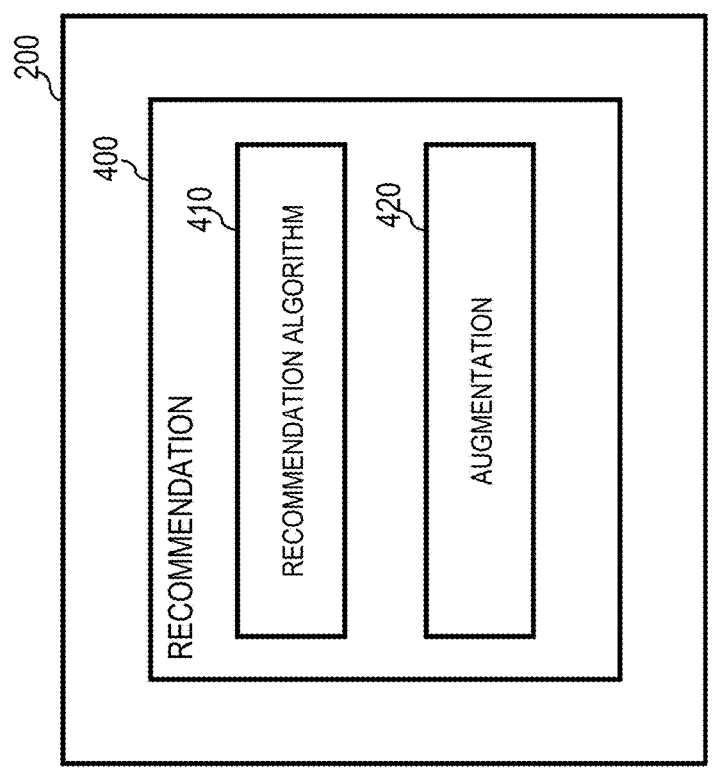
FIG. 3 illustrates an example recommendation engine, in accordance with an embodiment of the invention.

FIG. 3 illustrates an example recommendation engine 400, in accordance with an embodiment of the invention. In one embodiment, the system 200 comprises a recommendation engine 400 for augmenting missing values in historical and/or market data.

Specifically, the recommendation engine 400 comprises an augmentation unit 420 configured to recommend one or more values for augmenting one or more missing values in historical and/or market data for deals. The augmentation unit 420 may be used to recommend one or more unit cost values for augmenting one or more missing unit cost values in a cost data structure for a deal (i.e., a historical or a market deal). The augmentation unit 420 may also be used to recommend one or more baseline values for augmenting one or more missing baseline values for a deal (i.e., a historical or a market deal).

The recommendation engine 400 applies a recommendation algorithm 410 for determining one or more values (e.g., unit cost values or baseline values) to recommend. The recommendation algorithm 410 can be any type of recommendation system/algorithm. An example recommendation algorithm 410 is factorization through latent Dirichlet allocation (fLDA), as described in a publication titled "fLDA: Matrix Factorization through Latent Dirichlet Allocation" by Deepak Agarwal et al., published in the Proceedings of the 3rd ACM International Conference on Web Search and Data Mining, 2010. Using fLDA, metadata for a set of deals (i.e., historical or market deals) may be used as source context.

The augmentation unit 420 is further configured to generate a full cost data structure (e.g., a full cost matrix) for a highest service level in each deal of a set of deals (i.e., historical or market deals). A cost value for a service is represented as either a unit cost for a regular service or a percentage of total cost of the deal. The full cost data structure comprises one or more actual unit cost values and one or more recommended cost values for augmenting one or more missing unit cost values. The full cost data structure may be provided, as output, via the output interface 160 (FIG. 2).

The recommendation engine 400 may be used in different applications. For example, one embodiment of the recommendation engine 400 may be used to facilitate top-down pricing of a complex service deal. As another example, one embodiment of the recommendation engine 400 may be used to facilitate data analysis of historical deals in terms of costs, etc.

Figure 4:
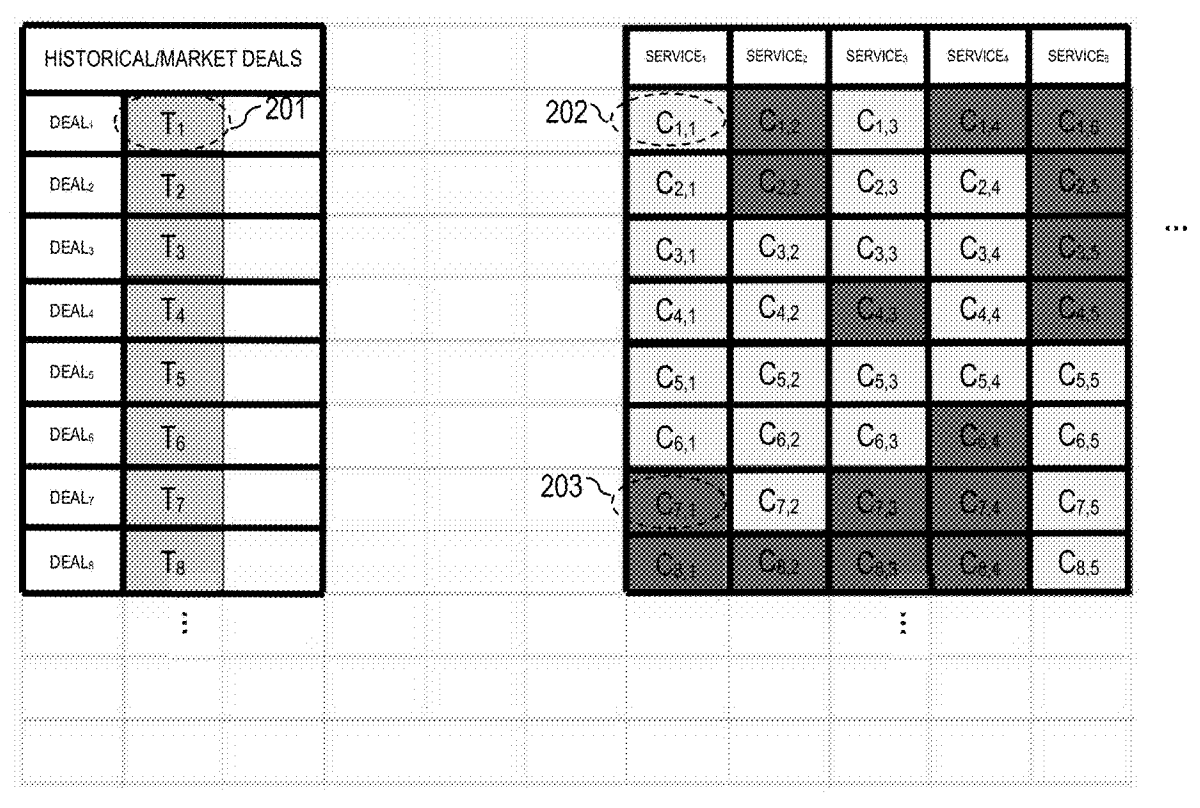

FIG. 4 illustrates an example representation of information relating to a set of deals, in accordance with an embodiment of the invention. As shown in FIG. 4, assume a set of deals (i.e., historical or market deals) received via the input interface 150 comprises at least eight (8) deals, where each deal has a corresponding cost data structure 201 identifying unit cost values for at least one service included in the deal. For example, the set comprises a first deal denoted as $DEAL_1$ with a corresponding cost data structure $T_1$, a second deal denoted as $DEAL_2$ with a corresponding cost data structure $T_2$, a third deal denoted as $DEAL_3$ with a corresponding cost data structure $T_3$, a fourth deal denoted as $DEAL_4$ with a corresponding cost data structure $T_4$, a fifth deal denoted as $DEAL_5$ with a corresponding cost data structure $T_5$, a sixth deal denoted as $DEAL_6$ with a corresponding cost data structure $T_6$, a seventh deal denoted as $DEAL_7$ with a corresponding cost data structure $T_7$, and an eight deal denoted as $DEAL_8$ with a corresponding cost data structure $T_8$.

In this specification, an actual/observed unit cost value is referenced using reference number 202, and a recommended unit cost value is referenced using reference number 203. As shown in FIG. 4, the cost data structure $T_5$ corresponding to the fifth deal $DEAL_5$ includes actual/observed unit cost values for five different services. Specifically, the cost data structure $T_5$ includes actual/observed unit cost values $C_{5,1}$, $C_{5,2}$, $C_{5,3}$, $C_{5,4}$, and $C_{5,5}$ for services $SERVICE_1$, $SERVICE_2$, $SERVICE_3$, $SERVICE_4$, and $SERVICE_5$, respectively.

As stated above, the recommendation engine 400 may be utilized to recommend one or more unit cost values for augmenting one or more missing unit cost values in a cost data structure for a deal. In one embodiment, the recommendation engine 400 may be utilized to recommend one or more unit cost values for one or more services missing in a particular deal of the set of deals, wherein the one or more missing services are included in another deal of the set of deals. For example, the fifth deal $DEAL_5$ includes services $SERVICE_2$, $SERVICE_4$, and $SERVICE_5$, but the first deal $DEAL_1$ does not include services $SERVICE_2$, $SERVICE_4$, and $SERVICE_5$. For the first deal $DEAL_1$, the recommendation engine 400 may be utilized to recommend unit cost values for services $SERVICE_2$, $SERVICE_4$, and $SERVICE_5$ that are missing in the first deal $DEAL_1$ but included in the fifth deal $DEAL_5$. As shown in FIG. 4, the cost data structure $T_1$ corresponding to the first deal $DEAL_1$ includes actual/observed unit cost values $C_{1,1}$ and $C_{1,3}$ for services $SERVICE_1$ and $SERVICE_3$, respectively, and recommended unit cost values $C_{1,2}$, $C_{1,4}$, and $C_{1,5}$ (provided by the recommendation engine 400) for services $SERVICE_2$, $SERVICE_4$, and $SERVICE_5$, respectively. As another example, the cost data structure $T_8$ corresponding to the eighth deal $DEAL_8$ includes an actual/observed unit cost value $C_{8,5}$ for service $SERVICE_5$, and recommended unit cost values $C_{8,1}$, $C_{8,2}$, $C_{8,3}$, and $C_{8,4}$ for services $SERVICE_1$, $SERVICE_2$, $SERVICE_3$, and $SERVICE_4$, respectively.

Top-Down Pricing of a Complex Service Deal

Different approaches to pricing a complex service deal include a top-down pricing and bottom-up pricing. Conventional techniques price services in a service deal via bottom-up pricing. Pricing complex, high-valued services in a service deal via bottom-up pricing is a complex, elaborate, time-consuming, and expensive process. Bottom-up pricing involves, for each service in a service deal, estimating cost of each individual activity of the service at a granular level, wherein a sum of each estimated cost is a cost of the service. An overall price of the service contract is then determined by adding a markup/gross profit margin to either (1) each cost of each service, or (2) a sum of each cost of each service. By comparison, top-down pricing involves costing and pricing of high level services included in a service deal based on market and historical data.

As stated above, one or more application units may execute/operate on the server devices 210 to provide a tool for estimating costs and prices of an in-flight deal based on information relating to peer deals (i.e., historical or market deals). In one embodiment, the system 200 provides an alternative, agile, top-down approach for pricing of complex service deals.

Figure 5:
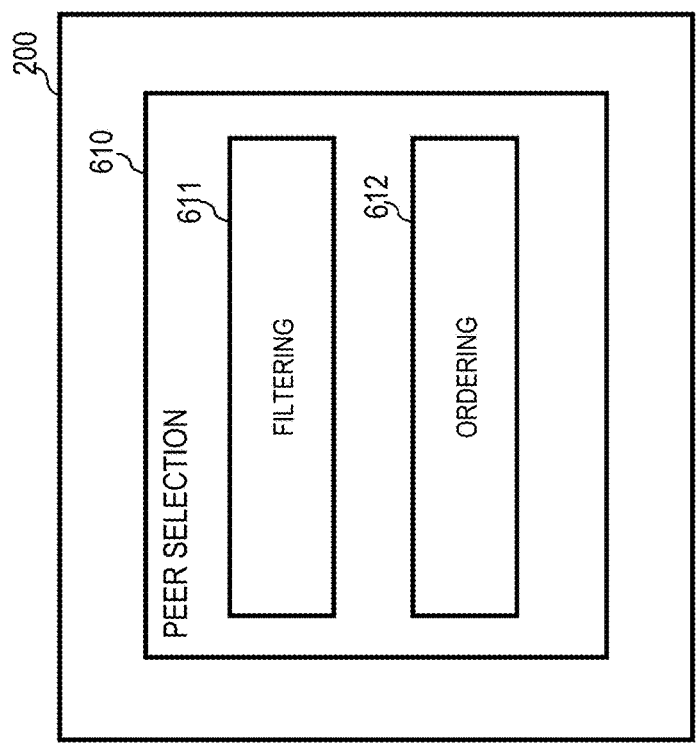
FIG. 5 illustrates an example peer selection engine, in accordance with an embodiment of the invention.

FIG. 5 illustrates an example peer selection engine 610, in accordance with an embodiment of the invention. In one embodiment, the system 200 comprises a peer selection engine 610 and a pricing engine 600 (FIG. 6) for top-down pricing of a complex service deal.

Table 1 below provides a listing of different parameters used in this specification.

TABLE 1

| Parameter | Definition |
|---|---|
| d | A set of peer deals (i.e., historical or market deals) |
| s | A given in-flight deal to price. |
| Services | A set of regular services, wherein Services = {$Service_1, \ldots, Service_M$}, M is cardinality of Services, $Service_i \in$ Services, and $i = \{1, \ldots, M\}$. |

TABLE 1-continued

| Parameter | Definition |
|---|---|
| $Services_s$ | A set of regular services for an in-flight deal s. |
| Baselines | A set of baseline values for Services, wherein $Baseline_i \in$ Baselines, and $Baseline_i$ is a unit/measure of amount of $Service_i$ provided by a service provider to a client. |
| $Baselines_s$ | A set of baseline values for regular services for an in-flight deal s. |
| CommonServices | A set of common services, wherein CommonServices = {$CommonService_1$, ..., $CommonService_N$}, N is cardinality of CommonServices, $CommonService_j \in$ CommonServices, and j = {1, ..., N}. |
| $CommonServices_s$ | A set of common services for an in-flight deal s. |
| MetaInformation | A set of metadata values for a deal, wherein MetaInformation = {DealOutcome, ContractYear, Geography, Industry}, DealOutcome is whether the deal is won or lost, ContractYear is a calendar year during which delivery of services in the deal to a client begins, Geography is a geographical location of the client, and Industry is an industry of the client. |
| $MetaInformation_s$ | A set of metadata values for an in-flight deal s. |

In one embodiment, the input interface 150 (FIG. 2) is further configured to receive, as input, information relating to an in-flight deal s. The information relating to the in-flight deal s comprises, but is not limited to, the following: (1) baselines (i.e., quantities) for a highest service level in a services hierarchy of the in-flight deal s, and (2) metadata for the in-flight deal s. For example, the information relating to the in-flight deal s comprises at least the following: (1) a set of regular services $Services_s$ included in the in-flight deal s, (2) a set of common services $CommonServices_s$ included in the in-flight deal s, (3) a set of baseline values $Baselines_s$ for the set $Services_s$, and (4) a set of metadata values $MetaInformation_s$ for the in-flight deal s.

Each regular service $Service_{s,i}$ of the set $Services_i$ is defined by a corresponding tuple ($Baseline_{s,i}$, $Cost_{s,i}$, $Price_{s,i}$), wherein $Baseline_{s,i}$ is a unit/measure of amount of the regular service $Service_{s,i}$ that will be provided, $Cost_{s,i}$ is a total cost of the regular service $Service_{s,i}$, and $Price_{s,i}$ is a price of the regular service $Service_{s,i}$.

Each common service $CommonService_{s,j}$ of the set $CommonServices_s$ is defined by a corresponding tuple ($PercentageOfTotalCost_{s,j}$, $TotalCost_s$, $TotalPrice_s$), wherein $PercentageOfTotalCost_{s,j}$ is cost of the common service $CommonService_{s,j}$ as a percentage of total cost of the in-flight deal s, $TotalCost_s$ is the total cost (i.e., sum) of all regular services $Services_s$ and all common services $CommonServices_s$ for the in-flight deal s, and $TotalPrice_s$ is the total cost (i.e., sum) of all regular services $Services_s$ and all common services $CommonServices_s$ for the in-flight deal s. $TotalCost_s$ is a total cost that a service provider pays to provide the in-flight deal s (i.e., cost of labor, hardware, etc.). $TotalPrice_s$ is a total price that is provided as a potential bidding price (i.e., the $TotalCost_s$ plus some pre-determined profit margin provided as a user-specified input parameter).

In one embodiment, the peer selection engine 610 is configured to: (1) load historical and/or market data from the storage devices 220, and (2) for each service in the in-flight deal s, select at least one corresponding set of peer deals for the service. In one example implementation, the peer selection engine 610 executes the selection in two stages. In a first stage, a filtering unit 611 of the peer selection engine 610 filters the historical and/or market data based on metadata for the in-flight deal s. Specifically, the filtering unit 611 filters out peer deals having metadata values for respective fields that do not match the set of metadata values $MetaInformation_s$ (i.e., {$DealOutcome_s$, $ContractYear_s$, $Geography_s$, $Industry_s$}) for the in-flight deal s. For instance, a service delivered from Asia is likely to have a different delivery cost compared to a service delivered to North America. Similarly, delivery of a service in 2015 is likely to happen at a different cost compared to delivery of the same service in 2016. Further, for each service in the set $Services_s$ or the set $CommonServices_s$, the filtering unit 611 filters out peer deals that do not include the service. Each service in the set $Services_s$ or the set $CommonServices_s$ has at least one corresponding set of peer deals.

In one embodiment, peer selection is done separately for historical deals and market deals, such that cost computation for an in-flight deal s is computed from two different perspectives—historical pricing and current market pricing. Each service in the set $Services_s$ or the set $CommonServices_s$ has at least one of a corresponding set of historical deals and a corresponding set of market deals.

In one embodiment, each set of historical deals corresponding to each service in the set $Services_s$ or the set $CommonServices_s$ must include a minimum number of historical deals; if this condition is not satisfied, the peer selection engine 610 outputs, via the output interface 160 (FIG. 2), a report indicating that no data was found for historical pricing. A user 30 may specify, as a user-specified input parameter, the minimum number of historical deals required.

In a second stage, an ordering unit 612 of the peer selection engine 610 orders each set of peer deals corresponding to each service in the set $Services_s$ or the set $CommonServices_s$. Specifically, for each set of peer deals corresponding to each service in the set $Services_s$, the ordering unit 612 applies a sorting criteria based on proximity of baseline values.

In this specification, $BaselineProximity_{dsi}$ is proximity (i.e., difference) of baseline values of a peer deal and the in-flight deal s. In one embodiment, $BaselineProximity_{dsi}$ is computed in accordance with equation (1) provided below:

$$BaselineProximity_{dsi} = |Baseline_{d,i} - Baseline_{s,i}| \qquad (1),$$

wherein $Baseline_{d,i}$ is a baseline value for $Service_i$ of a peer deal d, and $Baseline_{s,i}$ is a baseline value for $Service_i$ of the in-flight deal s.

The peer selection engine 610 assumes that a peer deal and the in-flight deal s are similar with respect to a service if the proximity (i.e., difference) between baseline values is small. Unit costs are typically similar for deals with similar/close proximity as baseline values define complexity of services. Variation of unit costs for the same service across different deals is related to the quantity (baselines) of that service in each deal. While service providers may achieve a quantity discount on unit costs for larger quantities, there is presently no set function that relates such quantity discount to baselines. The ordering unit 612 orders each set of peer deals corresponding to each service in the set $Services_s$ based on proximity of baseline values, resulting in an ordered set of peer deals.

For each set of peer deals corresponding to each service in the set $CommonServices_s$, the ordering unit 612 applies a sorting criteria based on proximity of total cost of regular services. In this specification, $CommonServiceProximity_{dsi}$ is proximity (i.e., difference) between a peer deal and the in-flight deal s based on total cost of regular services. In one embodiment, CommonServiceProximity$_{dsi}$ is computed in accordance with equation (2) provided below:

$$\text{CommonServiceProximity}_{dsi} = |\text{TotalCost}_{Services,d} - \text{TotalCost}_{Services,s}| \quad (2),$$

wherein TotalCost$_{Services,d}$ is total cost (i.e., sum) of all regular services for a peer deal d, and TotalCost$_{Services,s}$ is total cost (i.e., sum) of all regular services for the in-flight deal s. The ordering unit 612 orders each set of peer deals corresponding to each common service in the set CommonServices$_s$ based on proximity of total cost of regular services, resulting in an ordered set of peer deals.

Finally, the peer selection engine 610 sets a maximum threshold T for each ordered set of peer deals. Typically, for an ordered set of market deals, the maximum threshold T is one (1), whereas for an ordered set of historical deals, the maximum threshold T is set by a user 30. For each ordered set of peer deals, the top T peer deals of the set are used to determine costs for each service in the set Services$_s$ or the set CommonServices$_s$. Cost calculation for each service is performed for each year of the total number of contract years of the in-flight deal s.

In one embodiment, if a cost data structure for a peer deal selected by the peer selection engine 610 is missing one or more unit cost values for one or more services in the in-flight deal s, the system 200 may utilize the recommendation engine 400 to augment the missing unit cost values with recommended unit cost values.

Figure 6:
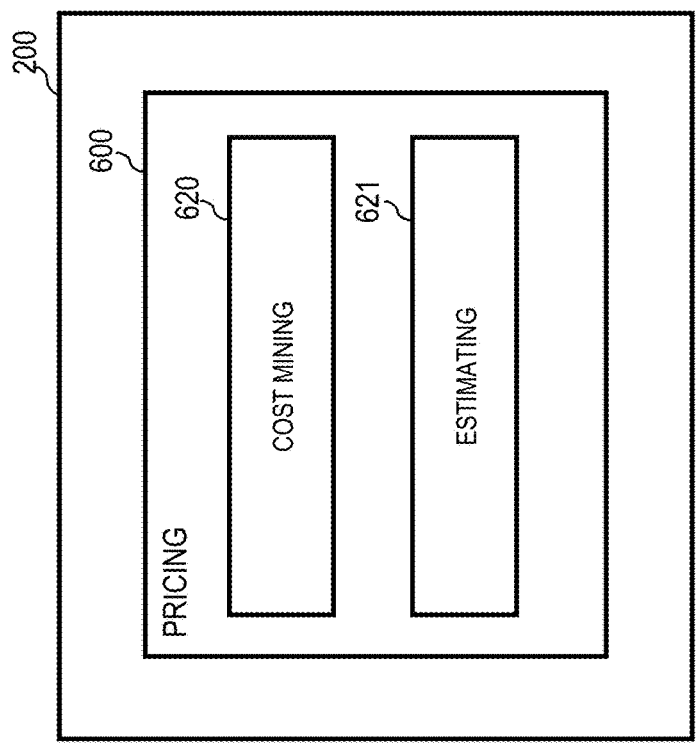
FIG. 6 illustrates an example pricing engine, in accordance with an embodiment of the invention.

FIG. 6 illustrates an example pricing engine 600, in accordance with an embodiment of the invention. The pricing engine 600 is configured to: (1) for each regular service of the set Services$_s$, estimate a corresponding cost and a corresponding price for the regular service, (2) for each common service of the set CommonServices$_s$, estimate a corresponding cost and a corresponding price for the common service, and (3) estimate a total cost and a total price for the in-flight deal s based on each cost and each price estimate for each regular service and each common service included in the in-flight deal s.

In one embodiment, the pricing engine 600 requires a full cost data structure for determining a set of price points for an in-flight deal s. If a cost data structure for a peer deal is missing one or more unit cost values for one or more services in the in-flight deal s, the system 200 may utilize the recommendation engine 400 to augment the missing unit cost values with recommended unit cost values during the top-down pricing of the in-flight deal s.

In one embodiment, the pricing engine 600 comprises a cost mining unit 620 configured to, for each service included in the in-flight deal s, mine costs from a corresponding set of peer deals for the service (e.g., a corresponding set of historical deals or a corresponding set of market deals selected by the peer selection engine 610). Specifically, the cost mining unit 620 is configured to: (1) mine costs for the set Services$_s$, and (2) mine costs for the set CommonServices$_s$.

In one example implementation, for each regular service of the set Services$_s$, the cost mining unit 620 computes, for each peer deal of an ordered set of peer deals for the service, a unit cost of the service in the peer deal by dividing a cost of the service by its baseline value. The cost mining unit 620 then retrieves a $l^{th}$ percentile of the unit costs computed. In one embodiment, the $l^{th}$ percentile is the median. In another embodiment, the $l^{th}$ percentile is an arbitrary value provided by a user 30 as a user-specified input parameter. In this specification, Unit-cost$_i$ is a unit cost of regular service Service$_i$, Baseline$_i$ is a baseline value of regular service Service$_i$, and Cost$_{s,i}$ is a cost of regular service Service$_i$ for the in-flight deal s. In one embodiment, Cost$_{s,i}$ is computed in accordance with equation (3) provided below:

$$\text{Cost}_{s,i} = \text{Unit-cost}_i * \text{Baseline}_i \quad (3).$$

In one example implementation, for each common service of the set CommonServices$_s$, the cost mining unit 620 computes, for each peer deal of an ordered set of peer deals for the service, a percentage of cost of the service to the overall cost of the peer deal. The cost mining unit 620 then retrieves a $k^{th}$ percentile of the percentages computed. In one embodiment, the $k^{th}$ percentile is the median. In another embodiment, the $k^{th}$ percentile is an arbitrary value provided by a user 30 as a user-specified input parameter.

The pricing engine 600 further comprises an estimating unit 621 for estimating a total cost and a total price of the in-flight deal s. In this specification, $P_{s,j}$ is a resulting percentage value of a common service CommonService$_j$, SUM$_{s,reg}$ is a total cost of all regular services of the in-flight deal s, and SUM$_{s,all}$ is a total cost of all services (i.e., regular services and common services) of the in-flight deal s. In one embodiment, SUM$_{s,all}$ and Cost$_{s,i}$ are simultaneously computed in accordance with formalized equations (4)-(5) provided below:

$$\text{SUM}_{s,all} = \Sigma \text{Cost}_{s,j} + \text{SUM}_{s,reg} \quad (4), \text{ and}$$

$$\text{Cost}_{s,i} = \text{SUM}_{s,all} * P_{s,j} \quad (5).$$

In one embodiment, the equations (4)-(5) are transformed to the following format:

$$(P_{s,1} - 1) * Cost_{s,1} + (P_{s,1} - 1) * Cost_{s,2} + \ldots + (P_{s,1} - 1) * Cost_{s,J} = -P_{s,1} * SUM_{s,reg}$$
$$(P_{s,2} - 1) * Cost_{s,1} + (P_{s,2} - 1) * Cost_{s,2} + \ldots + (P_{s,2} - 1) * Cost_{s,J} = -P_{s,2} * SUM_{s,reg}$$
$$\ldots$$
$$(P_{s,J} - 1) * Cost_{s,1} + (P_{s,J} - 1) * Cost_{s,2} + \ldots + (P_{s,J} - 1) * Cost_{s,J} = -P_{s,J} * SUM_{s,reg}$$

wherein J is the cardinality of the set CommonServices$_s$. In one embodiment, Cramer's rule is applied to compute cost of each common service per year in accordance with the equations provided above.

As stated above, cost computation for the in-flight deal s may be computed from the perspective of historical pricing and the perspective of current market pricing. One difference in computing costs from the perspective of market pricing compared to historical pricing is that, with regards to market data, percentiles for computing unit costs for regular services and unit percentages for common services are not applied when the maximum threshold of market deals is set to one (1).

From the perspective of historical pricing, the pricing engine 600 estimates a total cost of the in-flight deal s by adding up costs of all regular services Services$_s$ and all common services CommonServices$_s$ computed using corresponding sets of historical deals (e.g., sets of historical deals selected by the peer selection engine 610), and tacking on a pre-determined gross profit (e.g., an arbitrary value provided as a user-specified input parameter) to the total cost estimated to obtain a total price of the in-flight deal s. From the perspective of market pricing, the pricing engine 600 estimates a total cost of the in-flight deal s by adding up costs of all regular services Services$_s$ and all common services CommonServices$_s$ computed using corresponding sets of market deals (e.g., sets of market deals selected by the peer selection engine 610), and tacking on a pre-determined gross profit (e.g., an arbitrary value provided as a user-specified input parameter) to the total cost estimated to obtain a total price of the in-flight deal s.

Figure 7:
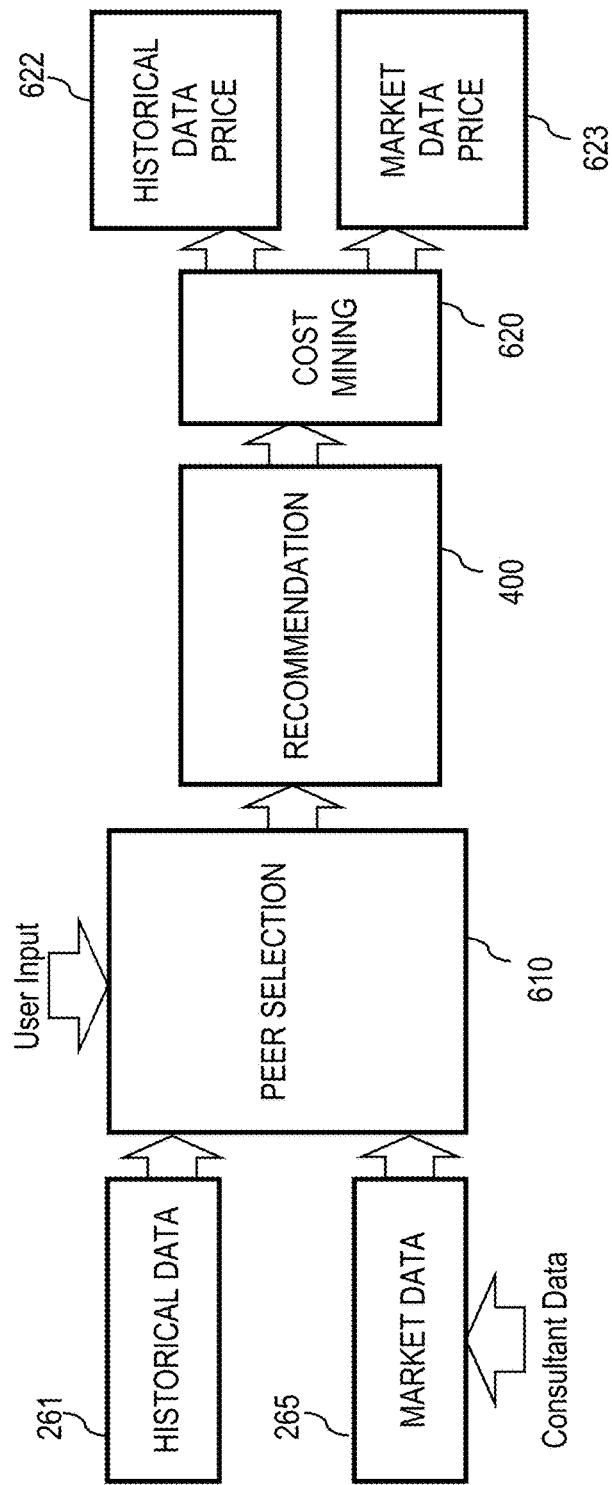
FIG. 7 illustrates an example process for determining a set of price points for an in-flight deal, in accordance with an embodiment of the invention.

FIG. 7 illustrates an example process for determining a set of price points for an in-flight deal, in accordance with an embodiment of the invention. To determine a set of historical data price points 622 from the perspective of historical pricing, the system 200 loads historical data from at least one collection 261 of historical data maintained on the storage devices 220. To determine a set of market data price points 623 from the perspective of market pricing, the system 200 loads market data from at least one collection 266 of market data maintained on the storage devices 220. The market data loaded may include data provided by consultants.

For each service in the in-flight deal, the system 200 utilizes the peer selection engine 610 to: (1) select a corresponding set of historical deals for the service, and (2) select a corresponding set of market deals for the service. The peer selection engine 610 may select peer deals based on one or more user-specified input parameters (e.g., minimum number of historical deals required).

For each service in the in-flight deal, if a peer deal (i.e., historical deal or market deal) selected for the service is missing one or more unit cost values, the system 200 may utilize the recommendation engine 400 to recommend unit cost values for augmenting the missing unit cost values.

For each service in the in-flight deal, the system 200 utilizes the cost mining unit 620 of the pricing engine 600 to: (1) mine unit costs from a corresponding set of historical deals selected for the service, and (2) mine unit costs from a corresponding set of market deals selected for the service. The system 200 then utilizes the estimating unit 621 of the pricing engine 600 to: (1) estimate a set of historical data price points 622 using unit costs mined from each set of historical deals selected, and (2) estimate a set of market data price points 623 using unit costs mined from each set of market deals selected.

Assessing Probability of Winning a Service Deal for Different Price Points

As stated above, one or more application units may execute/operate on the server devices 210 to provide a tool for predicting probability of winning an in-flight deal at any price point based on historical data pricing, market data pricing, a user-specified price, and/or any other price point.

Figure 8:
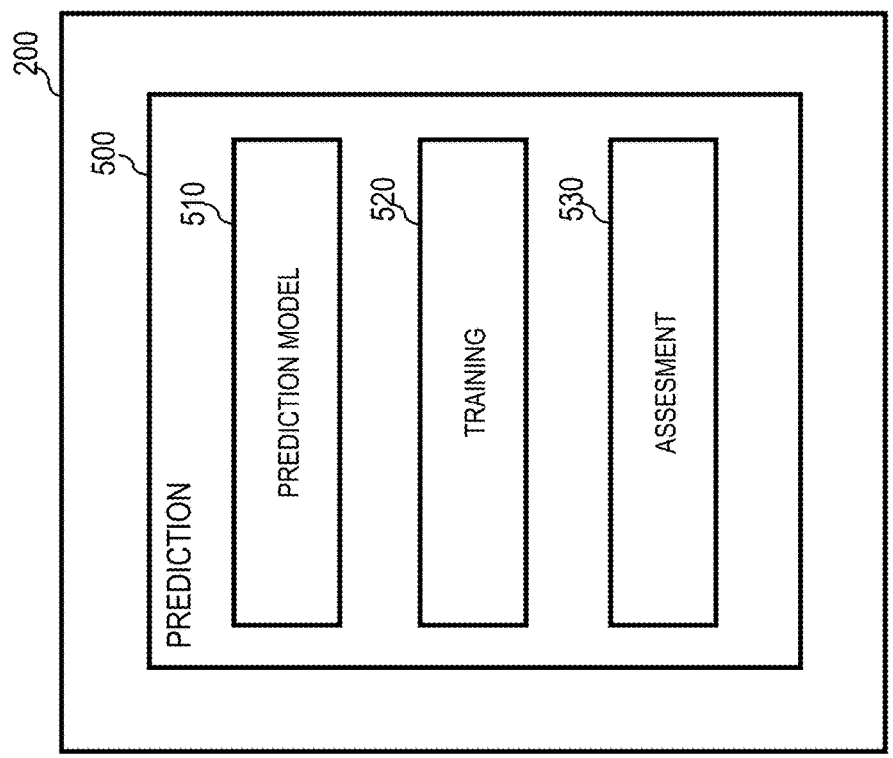
FIG. 8 illustrates an example prediction engine, in accordance with an embodiment of the invention.

FIG. 8 illustrates an example prediction engine 500, in accordance with an embodiment of the invention. In one embodiment, the system 200 comprises a prediction engine 500 for predicting probability of winning an in-flight deal at any price point based on historical pricing, market pricing, a user-specified price, and/or any other price point.

The prediction engine 500 is configured to receive, as input, one or more sets of price points for an in-flight deal. The sets of price points received may include a set of historical data price points, a set of market data price points, and/or a set of user-specified price points. In one embodiment, at least one set of price points received is provided by the pricing engine 600. In one embodiment, at least one set of price points received is provided as a user-specified input parameter via the input interface 150. For each set of price points received, the prediction engine 500 is configured to provide, as output, a prediction of probability (i.e., likelihood) of winning the in-flight deal for each price point of the set of price points.

The prediction engine 500 comprises a training unit 520 configured to apply, in a training stage, known supervised machine learning techniques to train a predictive analytics model ("prediction model") 510 for use in assessing probability of winning an in-flight deal for any price point. The prediction model 510 is trained based on metadata for peer deals.

In one embodiment, the prediction model 510 is a naive Bayesian model.

In one embodiment, the prediction engine 500 further comprises an assessment unit 530 configured to assess, based on the prediction model 510, probability of winning an in-flight deal for each price point of a set of price points.

Metadata for a deal (e.g., an in-flight deal, a peer deal) comprises at least one attribute of the deal ("deal attribute"). In one embodiment, deal attributes that are significant/influential factors in assessing probability of winning an in-flight deal for any price point include, but are not limited to, at least one of the following:

(a) Client-Market Segmentation:

This factor indicates market segment of a client by classifying the client based on size, market audience, and business market potential. For example, a client having a small or medium enterprise will have different characteristics and requirements than a client having a large multinational enterprise. Service providers are typically assigned to market segments that they are specialized/experts in.

(b) Geography:

This factor indicates geographical location of a client.

(c) Industry:

This factor indicates an industry area of a client.

(d) Deal Complexity:

This factor indicates complexity of a deal based on services included in the deal. Multiple levels of deal complexity may be defined by a business. The more complicated services included in a deal are in terms of number of services to deliver, amount of effort required to deliver the services, and degree of client interaction required, the higher the level of deal complexity for the deal.

(e) Global Vs Local:

This factor indicates whether a deal is global or local. A deal is global if services included in the deal are delivered to multiple countries that are not within close proximity of one another. By comparison, a deal is local if services included in the deal are delivered to only one country or two countries within close proximity of each other (e.g., Australia and New Zealand, or U.S.A. and Canada).

(f) Delivery Executive:

A deal may be assigned to a delivery executive responsible for delivery of services of the deal after contract signing. This factor indicates whether a delivery executive is assigned to a deal at an early stage of the deal or not.

(g) Third Party Advisor:

A client may use a third party advisor to help them determine a winning bid from the perspective of a neutral expert. This factor indicates whether a client has a third party advisor or not.

(h) Contract Length:

This factor indicates duration of delivery of services included in a deal. The duration typically ranges anywhere from one (1) to eight (8) years, though there are some exceptional circumstances where the duration may be longer.

(i) Number of Competitors:

This factor indicates total number of competitors bidding on the same deal.

(j) Competitor Classification and Analysis:

Competitors bidding on the same deal are classified based on competitor type. Examples of competitor types include, but are not limited to, multi-national service providers, local service providers, and low-cost service providers. Multi-national service providers are competitors that offer services globally (i.e., world-wide) or at least in multiple countries, and can deliver the services from multiple countries. Local service providers are competitors that offer services locally in one or two countries only. Low-cost service providers are competitors known to offer lower cost services, and are typically from off-shore/global resourcing countries (e.g., India, China). The presence of low-cost service providers as competitors, however, does not necessarily reduce chances of winning a deal as some clients (e.g., larger clients or clients with more expensive contracts) may prefer to select a local service provider even if this is more expensive. Competitors may be further classified based on whether they are niche or consultant. Niche service providers are specialized in a particular type of industry, sector, or service; presence of niche service providers as competitors may strongly influence chances of winning a deal. Some competitors have a consultant built-in arm that some clients may have a preference for. Further, for an IT service deal, competitors may be classified further based on whether they provide cloud services, software services, or network services.

Figure 9:
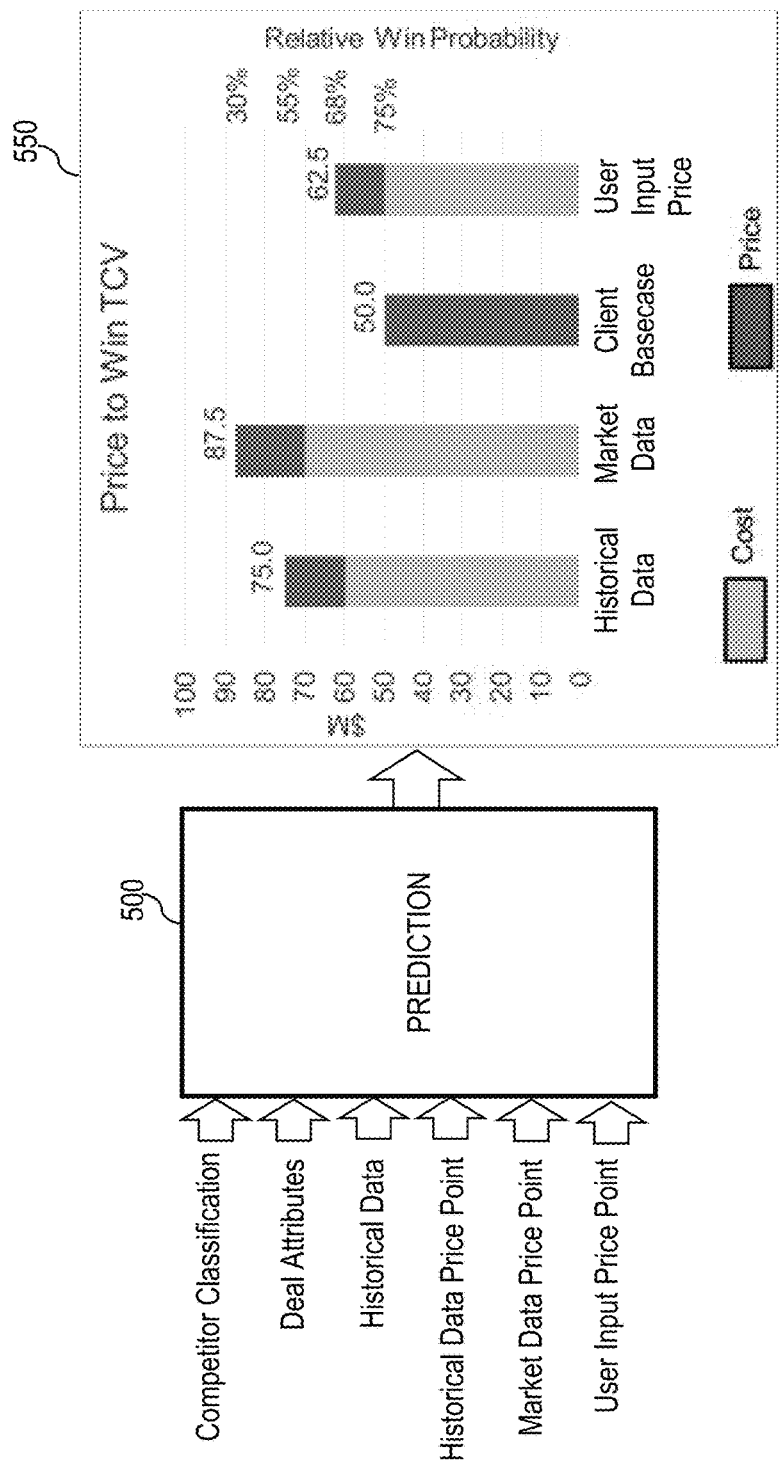
FIG. 9 illustrates an example process for predicting probability of winning an in-flight deal at any price point, in accordance with an embodiment of the invention.

FIG. 9 illustrates an example process for predicting probability of winning an in-flight deal at any price point, in accordance with an embodiment of the invention. If the prediction engine 500 receives a set of historical data price points, the prediction engine 500 predicts a probability of winning the in-flight deal for each price point of the set of historical data price points. If the prediction engine 500 receives a set of market data price points, the prediction engine 500 predicts a probability of winning the in-flight deal for each price point of the set of market data price points. If the prediction engine 500 receives a set of user-specified price points, the prediction engine 500 predicts a probability of winning the in-flight deal for each price point of the set of user-specified price points. The prediction engine 500 utilizes the prediction model 510 that factors into account historical data, competitor classification and other deal attributes. An example prediction chart 550 showing different probabilities predicted by the prediction engine 500 is shown in FIG. 9.

Each of the recommendation engine 400, the peer selection engine 610, the pricing engine 600, and the prediction engine 500 may be used as a stand alone system or in combination.

Figure 10:
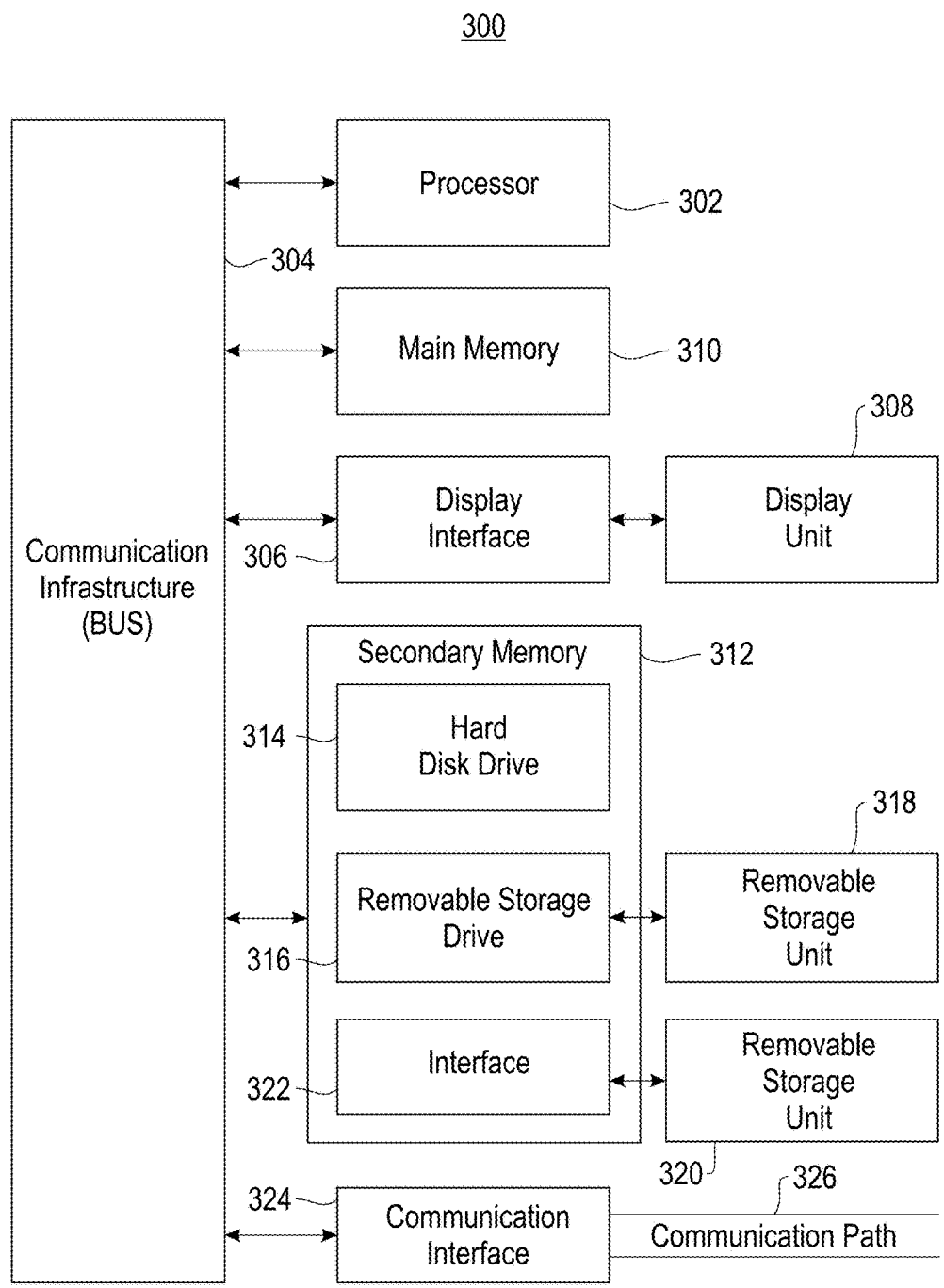
FIG. 10 is a high level block diagram showing an information processing system useful for implementing an embodiment of the present invention.

FIG. 10 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 is, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
receiving, at a prediction engine operating on a server device, information relating to a service deal that a service provider is bidding on from a database maintained on a storage device, wherein the service deal comprises a hierarchy of services comprising multiple levels of service, the information relating to the service deal comprises a set of price points, metadata, and a set of baseline values for a highest level of service included in the hierarchy of services, each price point is a potential bidding price for the service deal that the service provider may offer during the bidding, the metadata comprises information relating to one or more other service providers bidding on the same service deal, and the set of baseline values comprises, for each service included in the highest level of service, a corresponding amount of the service the service provider will provide; and
for each price point of the set of price points, predicting, via the prediction engine, a probability of the service provider winning the bidding at the price point based on a predictive analytics model trained by the prediction engine and the information relating to the service deal;
wherein the predicting comprises top-down pricing of the service deal, and the top-down pricing comprises determining a cost and price of each service included in the highest level of service, and determining a total cost and total price of the service deal based on each cost and price of each service determined.

2. The method of claim 1, further comprising:
in a training stage:
receiving information for a set of deals, wherein the information for the set of deals comprises, for each deal of the set of deals, metadata relating to the deal and a deal outcome of the deal; and
training the predictive analytics model based on the information for the set of deals.

3. The method of claim 2, wherein the set of deals comprises one or more of the following: a historical deal, and a market deal.

4. The method of claim 1, wherein the set of price points comprises one or more of the following: a price point based on historical pricing, a price point based on market pricing, a price point based on user-specified pricing, and a price point based on any other user input.

5. The method of claim 1, wherein the metadata further comprises at least one of the following factors in assessing probability of the service provider winning the bidding at a price point of the set of price points: complexity of the service deal, whether the service deal is global or local, contract length of the service deal, timing of assignment of the service deal to a delivery executive, presence of a third party advisor, or market segment of a client of the service deal.

6. The method of claim 1, wherein the information relating to one or more other service providers bidding on the same service deal comprises data indicative of one or more of the following: whether the one or more other service providers are multi-national service providers, local service providers, low-cost service providers, or another category of service providers.

7. The method of claim 1, wherein the information relating to one or more other service providers bidding on the same service deal comprises data indicative of one or more of the following: whether the one or more other service providers are niche, consultant, cloud service providers, software service providers, network service providers, or another classification of service providers.

8. A system comprising a computer processor, a computer-readable hardware storage device, and program code embodied with the computer-readable hardware storage device for execution by the computer processor to implement a method comprising:
receiving, at a prediction engine operating on a server device, information relating to a service deal that a service provider is bidding on from a database maintained on a storage device, wherein the service deal comprises a hierarchy of services comprising multiple levels of service, the information relating to the service deal comprises a set of price points, metadata, and a set of baseline values for a highest level of service included in the hierarchy of services, each price point is a potential bidding price for the service deal that the service provider may offer during the bidding, the metadata comprises information relating to one or more other service providers bidding on the same service deal, and the set of baseline values comprises, for each service included in the highest level of service, a corresponding amount of the service the service provider will provide; and
for each price point of the set of price points, predicting, via the prediction engine, a probability of the service provider winning the bidding at the price point based on a predictive analytics model trained by the prediction engine and the information relating to the service deal;
wherein the predicting comprises top-down pricing of the service deal, and the top-down pricing comprises determining a cost and price of each service included in the highest level of service, and determining a total cost and total price of the service deal based on each cost and price of each service determined.

9. The system of claim 8, further comprising:
in a training stage:
receiving information for a set of deals, wherein the information for the set of deals comprises, for each deal of the set of deals, metadata relating to the deal and a deal outcome of the deal; and
training the predictive analytics model based on the information for the set of deals.

10. The system of claim 9, wherein the set of deals comprises one or more of the following: a historical deal, and a market deal.

11. The system of claim 8, wherein the set of price points comprises one or more of the following: a price point based on historical pricing, a price point based on market pricing, a price point based on user-specified pricing, and a price point based on any other user input.

12. The system of claim 8, wherein the metadata further comprises at least one of the following factors in assessing probability of the service provider winning the bidding at a price point of the set of price points: complexity of the service deal, whether the service deal is global or local, contract length of the service deal, timing of assignment of the service deal to a delivery executive, presence of a third party advisor, or market segment of a client of the service deal.

13. The system of claim 8, wherein the information relating to one or more other service providers bidding on the same service deal comprises data indicative of one or more of the following: whether the one or more other service providers are multi-national service providers, local service providers, low-cost service providers, or another category of service providers.

14. The system of claim 8, wherein the information relating to one or more other service providers bidding on the same service deal comprises data indicative of one or more of the following: whether the one or more other service providers are niche, consultant, cloud service providers, software service providers, network service providers, or another classification of service providers.

15. A non-transitory computer program product comprising a computer-readable hardware storage device having program code embodied therewith, the program code being executable by a computer to implement a method comprising:

receiving, at a prediction engine operating on a server device, information relating to a service deal that a service provider is bidding on from a database maintained on a storage device, wherein the service deal comprises a hierarchy of services comprising multiple levels of service, the information relating to the service deal comprises a set of price points, metadata, and a set of baseline values for a highest level of service included in the hierarchy of services, each price point is a potential bidding price for the service deal that the service provider may offer during the bidding, the metadata comprises information relating to one or more other service providers bidding on the same service deal, and the set of baseline values comprises, for each service included in the highest level of service, a corresponding amount of the service the service provider will provide; and for each price point of the set of price points, predicting, via the prediction engine, a probability of the service provider winning the bidding at the price point based on a predictive analytics model trained by the prediction engine and the information relating to the service deal;

wherein the predicting comprises top-down pricing of the service deal, and the top-down pricing comprises determining a cost and price of each service included in the highest level of service, and determining a total cost and total price of the service deal based on each cost and price of each service determined.

16. The computer program product of claim 15, further comprising:

in a training stage:
receiving information for a set of deals, wherein the information for the set of deals comprises, for each deal of the set of deals, metadata relating to the deal and a deal outcome of the deal; and
training the predictive analytics model based on the information for the set of deals;
wherein the set of deals comprises one or more of the following: a historical deal, and a market deal.

17. The computer program product of claim 15, wherein the set of price points comprises one or more of the following: a price point based on historical pricing, a price point based on market pricing, a price point based on user-specified pricing, and a price point based on any other user input.

18. The computer program product of claim 15, wherein the metadata further comprises at least one of the following factors in assessing probability of the service provider winning the bidding at a price point of the set of price points: complexity of the service deal, whether the service deal is global or local, contract length of the service deal, timing of assignment of the service deal to a delivery executive, presence of a third party advisor, or market segment of a client of the service deal.

19. The computer program product of claim 15, wherein the information relating to one or more other service providers bidding on the same service deal comprises data indicative of one or more of the following: whether the one or more other service providers are multi-national service providers, local service providers, low-cost service providers, or another category of service providers.

20. The computer program product of claim 15, wherein the information relating to one or more other service providers bidding on the same service deal comprises data indicative of one or more of the following: whether the one or more other service providers are niche, consultant, cloud service providers, software service providers, network service providers, or another classification of service providers.

* * * * *